(12) United States Patent
Thompson et al.

(10) Patent No.: US 9,582,734 B2
(45) Date of Patent: *Feb. 28, 2017

(54) KEY BLANK IDENTIFICATION SYSTEM WITH BITTING ANALYSIS

(71) Applicant: HY-KO PRODUCTS COMPANY, Northfield, OH (US)

(72) Inventors: Chester O. D. Thompson, Painesville, OH (US); William R. Mutch, North Ridgeville, OH (US); Randall A. Porras, North Olmsted, OH (US)

(73) Assignee: HY-KO PRODUCTS COMPANY, Northfield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,308

(22) Filed: Jan. 3, 2014

(65) Prior Publication Data

US 2014/0140628 A1 May 22, 2014

Related U.S. Application Data

(63) Continuation of application No. 12/772,763, filed on May 3, 2010, now Pat. No. 8,634,655.

(Continued)

(51) Int. Cl.
*G06K 9/62* (2006.01)
*G06K 9/48* (2006.01)
(Continued)

(52) U.S. Cl.
CPC .......... *G06K 9/6201* (2013.01); *G01B 11/02* (2013.01); *G06K 9/48* (2013.01); *B23C 2235/41* (2013.01);
(Continued)

(58) Field of Classification Search
CPC .......... B23C 2235/24; B23C 2235/28; B23C 2235/41; B23C 2235/44; B23Q 33/00; G06K 2209/401
See application file for complete search history.

(56) References Cited

U.S. PATENT DOCUMENTS

| 40,480 A | 3/1863 | Hill |
| 288,300 A | 11/1883 | Borowsky |

(Continued)

FOREIGN PATENT DOCUMENTS

| CH | 673612 | 3/1990 |
| DE | 2951065 | 7/1981 |

(Continued)

OTHER PUBLICATIONS

Chinese Office Action, Application No. 200780009675.0, Hy-Ko Products Company, Dec. 4 2009.

(Continued)

*Primary Examiner* — Michelle Entezari
(74) *Attorney, Agent, or Firm* — McDonald Hopkins LLC

(57) ABSTRACT

A key identification system is provided. The key identification system comprises a sensing device configured to extract bitting information from a master key, and a logic configured to analyze the image. The sensing device may be configured to capture information about the bittings of the master key, such as an image of the bittings. The logic analyzes information about the bittings of the master key and compares it with bitting characteristics of known key blanks to determine the likelihood of a match between the master key and a known key blank.

23 Claims, 6 Drawing Sheets

Related U.S. Application Data

(60) Provisional application No. 61/215,122, filed on May 1, 2009, provisional application No. 61/275,648, filed on Sep. 1, 2009.

(51) Int. Cl.
  *G01S 11/02* (2010.01)
  *G01B 11/02* (2006.01)

(52) U.S. Cl.
  CPC .............. *Y10T 409/300952* (2015.01); *Y10T 409/301008* (2015.01); *Y10T 409/301064* (2015.01)

(56) References Cited

U.S. PATENT DOCUMENTS

| | | |
|---|---|---|
| 466,044 A | 12/1891 | Jacobs |
| 943,806 A | 12/1909 | Billings |
| 1,059,545 A | 4/1913 | Kunze |
| 1,081,472 A | 12/1913 | Tucker |
| 1,135,676 A | 4/1915 | Engelbert |
| 1,218,653 A | 3/1917 | Heldrich |
| 1,367,280 A | 2/1921 | Reiges |
| 1,390,958 A | 9/1921 | Hulbert |
| 1,440,459 A | 1/1923 | Greff |
| 1,628,637 A | 5/1927 | Shaw |
| 1,656,295 A | 1/1928 | Schechter |
| 1,674,291 A | 6/1928 | Malone |
| 1,702,488 A | 2/1929 | Baird |
| 1,750,218 A | 3/1930 | Falk |
| 1,752,668 A | 4/1930 | Johnson |
| 1,775,921 A | 9/1930 | Williams |
| 1,848,046 A | 3/1932 | Caron |
| 1,889,461 A | 11/1932 | Hansen |
| 1,923,164 A | 8/1933 | Roos |
| 1,948,260 A | 2/1934 | Fowler |
| 1,961,516 A | 6/1934 | Hansen |
| 1,978,628 A | 10/1934 | Hansen |
| 1,991,151 A | 2/1935 | Hansen |
| 2,032,820 A | 3/1936 | Turrell |
| 2,038,949 A | 4/1936 | Mintz |
| 2,098,728 A | 11/1937 | McPhee |
| 2,105,099 A | 1/1938 | Schuyler |
| 2,114,597 A | 4/1938 | Goddard |
| 2,148,668 A | 2/1939 | Yoskowitz et al. |
| 2,176,106 A | 10/1939 | Segal |
| 2,274,012 A | 2/1942 | Swayze et al. |
| 2,325,541 A | 7/1943 | Poole |
| 2,329,269 A | 9/1943 | Jacobi |
| 2,386,816 A | 10/1945 | Scholz |
| 2,430,924 A | 11/1947 | Fowle et al. |
| 2,445,041 A | 7/1948 | Scholz |
| 2,499,124 A | 2/1950 | Zipp et al. |
| 2,556,577 A | 6/1951 | Drake |
| 2,582,012 A | 1/1952 | Currier |
| 2,605,294 A | 7/1952 | Barnhart |
| 2,622,485 A | 12/1952 | Martellotti |
| 2,645,978 A | 7/1953 | Sejarto et al. |
| 2,707,335 A | 5/1955 | Falk |
| 2,728,251 A | 12/1955 | Turner |
| 2,860,884 A | 11/1958 | Sloan et al. |
| 2,929,177 A | 3/1960 | Sheps |
| 2,940,183 A | 6/1960 | Fromberg |
| 3,053,149 A | 9/1962 | Rossetti |
| 3,094,039 A | 6/1963 | Spain |
| 3,138,999 A | 6/1964 | Haggstrom |
| 3,172,969 A | 3/1965 | Haggstrom |
| 3,245,149 A | 4/1966 | Haggstrom |
| 3,257,908 A | 6/1966 | Haggstrom |
| 3,259,022 A | 7/1966 | Vietorisz |
| 3,276,328 A | 10/1966 | Schreiber et al. |
| 3,286,596 A | 11/1966 | Lieptz |
| 3,286,597 A | 11/1966 | Schwartz |
| 3,305,100 A | 2/1967 | Barbee |
| 3,323,420 A | 6/1967 | Roxburgh |
| 3,388,619 A | 6/1968 | Schreiber et al. |
| 3,418,882 A | 12/1968 | Brand |
| 3,424,056 A | 1/1969 | Stolove et al. |
| 3,429,207 A | 2/1969 | John |
| 3,430,535 A | 3/1969 | Haggstrom |
| 3,440,906 A | 4/1969 | Allen |
| 3,442,174 A | 5/1969 | Weiner et al. |
| 3,457,831 A | 7/1969 | Adler et al. |
| 3,466,747 A | 9/1969 | Patriquin et al. |
| 3,496,636 A | 2/1970 | Lieptz |
| 3,499,366 A | 3/1970 | Spain |
| RE26,848 E | 4/1970 | Simon |
| 3,599,147 A | 8/1971 | Rogers et al. |
| 3,602,092 A | 8/1971 | Richens |
| 3,625,111 A | 12/1971 | Carlo et al. |
| 3,633,451 A | 1/1972 | Lieptz |
| 3,651,573 A | 3/1972 | Kaplan |
| 3,656,402 A | 4/1972 | French |
| 3,675,536 A | 7/1972 | Hungerford, Jr. et al. |
| 3,682,041 A | 8/1972 | Essig |
| 3,707,999 A | 1/1973 | Coats |
| 3,722,341 A | 3/1973 | Hungerford, Jr. et al. |
| RE27,665 E | 6/1973 | Spain |
| 3,769,865 A | 11/1973 | Kleist |
| 3,773,360 A | 11/1973 | Timbers |
| 3,792,639 A | 2/1974 | Richens et al. |
| 3,795,174 A | 3/1974 | Oliver et al. |
| 3,796,130 A | 3/1974 | Gartner |
| 3,807,276 A | 4/1974 | Oliver |
| 3,810,416 A | 5/1974 | Nelms, Jr. |
| 3,826,555 A | 7/1974 | Matsumoto |
| 3,848,235 A | 11/1974 | Lewis et al. |
| 3,865,011 A | 2/1975 | Patriquin |
| 3,870,895 A | 3/1975 | Lax et al. |
| 3,880,047 A | 4/1975 | Dosier |
| 3,884,121 A | 5/1975 | Agius |
| 3,902,382 A | 9/1975 | Lieptz |
| 3,919,589 A | 11/1975 | Hanak |
| 3,919,920 A | 11/1975 | Schlage |
| 3,945,298 A | 3/1976 | Cockroft |
| 3,955,179 A | 5/1976 | Planke |
| 3,956,968 A | 5/1976 | Crasnianski |
| 3,978,764 A | 9/1976 | Patriquin |
| 3,981,214 A | 9/1976 | Wich |
| 4,012,991 A | 3/1977 | Uyeda |
| 4,019,415 A | 4/1977 | Wich |
| 4,023,464 A | 5/1977 | Zion |
| 4,051,748 A | 10/1977 | Sherman |
| 4,062,261 A | 12/1977 | Stahl |
| 4,088,060 A | 5/1978 | Johns |
| 4,090,303 A | 5/1978 | Uyeda |
| 4,092,806 A | 6/1978 | Wich |
| 4,105,340 A | 8/1978 | Kempf |
| 4,117,763 A | 10/1978 | Uyeda |
| 4,121,292 A | 10/1978 | Galanis et al. |
| 4,132,151 A | 1/1979 | Weber |
| D251,365 S | 3/1979 | Lipinski |
| 4,143,582 A | 3/1979 | Heimann |
| 4,166,949 A | 9/1979 | Pold et al. |
| 4,171,161 A | 10/1979 | Jung |
| 4,172,632 A | 10/1979 | Holmes, Jr. |
| 4,188,163 A | 2/1980 | Juskevic |
| 4,223,791 A | 9/1980 | Taggart |
| 4,233,746 A | 11/1980 | Troillet |
| D257,758 S | 1/1981 | Limacher |
| 4,251,173 A | 2/1981 | Saucedo |
| 4,256,423 A | 3/1981 | Juskevic |
| 4,281,379 A | 7/1981 | Austin |
| 4,283,859 A | 8/1981 | Roland |
| 4,294,096 A | 10/1981 | Heimann |
| 4,300,042 A | 11/1981 | Oldenkamp et al. |
| 4,300,170 A | 11/1981 | Sakamoto |
| 4,300,836 A | 11/1981 | Holmes et al. |
| 4,301,373 A | 11/1981 | Sjodin |
| 4,354,780 A | 10/1982 | Bougiouris |
| 4,359,299 A | 11/1982 | Sagarian |
| 4,373,414 A | 2/1983 | Agius |
| 4,426,179 A | 1/1984 | Jefferson |
| 4,432,142 A | 2/1984 | Korsak |

(56) References Cited

U.S. PATENT DOCUMENTS

| | | |
|---|---|---|
| 4,433,487 A | 2/1984 | Roland |
| 4,437,150 A | 3/1984 | Dahlgren, Jr. et al. |
| 4,453,432 A | 6/1984 | Widen |
| 4,468,994 A | 9/1984 | Lieptz |
| 4,472,056 A | 9/1984 | Nakagawa et al. |
| 4,479,673 A | 10/1984 | Inaba et al. |
| 4,521,142 A | 6/1985 | Juskevic |
| 4,525,908 A | 7/1985 | Bernstein |
| 4,526,498 A | 7/1985 | Fieldhouse |
| 4,541,760 A | 9/1985 | Zoueki |
| 4,545,569 A | 10/1985 | Schroder et al. |
| 4,551,046 A | 11/1985 | Kinas |
| 4,553,844 A | 11/1985 | Nakagawa et al. |
| 4,557,488 A | 12/1985 | Litherland |
| 4,558,215 A | 12/1985 | Kaneko et al. |
| 4,562,759 A | 1/1986 | Schmitt |
| 4,592,683 A | 6/1986 | Wu |
| 4,601,185 A | 7/1986 | Sheldon |
| 4,614,465 A | 9/1986 | Wu |
| 4,625,107 A | 11/1986 | Planke |
| 4,638,567 A | 1/1987 | Leversee |
| 4,647,028 A | 3/1987 | Yang |
| 4,648,585 A | 3/1987 | Yang |
| 4,651,604 A | 3/1987 | Almblad et al. |
| 4,652,738 A | 3/1987 | Nishihara et al. |
| 4,652,765 A | 3/1987 | Nishihara |
| 4,653,104 A | 3/1987 | Tamura |
| 4,656,590 A | 4/1987 | Ace |
| 4,657,448 A | 4/1987 | Alexander |
| 4,666,351 A | 5/1987 | Marchal |
| 4,671,711 A | 6/1987 | Steinbach et al. |
| 4,677,835 A | 7/1987 | Almblad |
| 4,679,331 A | 7/1987 | Koontz |
| 4,687,389 A | 8/1987 | Santii et al. |
| 4,697,300 A | 10/1987 | Warlop |
| 4,710,808 A | 12/1987 | Hoogenboom et al. |
| 4,717,294 A | 1/1988 | Grasser |
| 4,741,652 A | 5/1988 | Marchal |
| 4,767,110 A | 8/1988 | Yang |
| 4,780,032 A | 10/1988 | Uyeda et al. |
| 4,783,829 A | 11/1988 | Miyakawa et al. |
| 4,803,371 A | 2/1989 | Durland |
| 4,805,224 A | 2/1989 | Koezuka et al. |
| 4,809,341 A | 2/1989 | Matsui et al. |
| 4,821,200 A | 4/1989 | Oberg |
| 4,821,393 A | 4/1989 | Spigarelli |
| 4,839,913 A | 6/1989 | Annis et al. |
| 4,845,764 A | 7/1989 | Ueda et al. |
| 4,848,116 A | 7/1989 | Lizotte |
| 4,853,866 A | 8/1989 | Andrada Galan et al. |
| 4,868,559 A | 9/1989 | Pinnow |
| 4,898,504 A | 2/1990 | Agius et al. |
| 4,899,391 A | 2/1990 | Cimino et al. |
| 4,909,892 A | 3/1990 | Quinn et al. |
| 4,929,129 A | 5/1990 | Dickson |
| 4,929,843 A | 5/1990 | Chmielewski, Jr. et al. |
| 4,941,335 A | 7/1990 | Allen |
| 4,969,782 A | 11/1990 | Castain |
| 4,971,489 A | 11/1990 | Womack |
| 4,993,291 A | 2/1991 | Sopko |
| 4,998,349 A | 3/1991 | Killeen |
| 5,029,459 A | 7/1991 | Almblad |
| 5,043,144 A | 8/1991 | Gordon et al. |
| 5,056,204 A | 10/1991 | Bartschi |
| 5,058,940 A | 10/1991 | Hart |
| 5,083,759 A | 1/1992 | Pollak et al. |
| 5,088,864 A | 2/1992 | Yanagida |
| 5,094,538 A | 3/1992 | Reedman et al. |
| 5,096,346 A | 3/1992 | Ueda |
| 5,111,056 A | 5/1992 | Yoshimura et al. |
| 5,119,190 A | 6/1992 | Lemelson |
| 5,122,018 A | 6/1992 | Zion |
| 5,127,532 A | 7/1992 | Cimino et al. |
| 5,128,531 A | 7/1992 | Fadel |
| 5,130,064 A | 7/1992 | Smalley et al. |
| 5,139,246 A | 8/1992 | Yakou |
| 5,144,561 A | 9/1992 | Soper |
| 5,146,689 A | 9/1992 | Roland |
| 5,165,315 A | 11/1992 | Terada |
| 5,167,171 A | 12/1992 | Heredia |
| 5,171,112 A | 12/1992 | Roland |
| 5,192,469 A | 3/1993 | Smalley et al. |
| 5,201,203 A | 4/1993 | Almblad |
| 5,229,619 A | 7/1993 | Van Amstel |
| 5,244,321 A | 9/1993 | Sopko |
| 5,255,199 A | 10/1993 | Barkman et al. |
| 5,259,708 A | 11/1993 | Brice |
| 5,271,698 A | 12/1993 | Heredia et al. |
| 5,293,687 A | 3/1994 | Willoughby, Jr. et al. |
| 5,307,151 A | 4/1994 | Hof et al. |
| 5,308,360 A | 5/1994 | Neitzke et al. |
| 5,311,286 A | 5/1994 | Pike |
| 5,311,756 A | 5/1994 | Villani |
| 5,311,758 A | 5/1994 | Neitzke et al. |
| 5,314,274 A | 5/1994 | Heredia et al. |
| D348,393 S | 7/1994 | Neitzke et al. |
| 5,330,168 A | 7/1994 | Enomoto et al. |
| 5,351,409 A | 10/1994 | Heredia |
| 5,360,299 A | 11/1994 | Oliana |
| 5,363,463 A | 11/1994 | Kleinerman |
| 5,365,812 A | 11/1994 | Harnden |
| 5,382,784 A | 1/1995 | Eberhardt |
| 5,393,967 A | 2/1995 | Rice et al. |
| 5,416,591 A | 5/1995 | Yoshimura et al. |
| 5,429,202 A | 7/1995 | Millard et al. |
| 5,441,369 A | 8/1995 | Foscan et al. |
| 5,443,339 A | 8/1995 | Heredia et al. |
| 5,485,399 A | 1/1996 | Saigo et al. |
| 5,496,138 A | 3/1996 | Drori |
| 5,497,888 A | 3/1996 | Michaels et al. |
| 5,503,785 A | 4/1996 | Crump et al. |
| 5,515,903 A | 5/1996 | Hronas et al. |
| 5,538,374 A | 7/1996 | Cole et al. |
| 5,543,103 A | 8/1996 | Hogan et al. |
| 5,545,367 A | 8/1996 | Bae et al. |
| 5,552,992 A | 9/1996 | Hunter |
| 5,555,176 A | 9/1996 | Menhennett et al. |
| 5,556,240 A | 9/1996 | Almblad |
| 5,583,443 A | 12/1996 | McMurtry et al. |
| 5,592,728 A | 1/1997 | Susnjara |
| 5,594,652 A | 1/1997 | Penn et al. |
| 5,607,267 A | 3/1997 | Heredia et al. |
| 5,617,323 A | 4/1997 | Stansberry et al. |
| RE35,518 E | 5/1997 | Sussina |
| 5,630,332 A | 5/1997 | Aldieri et al. |
| 5,660,509 A | 8/1997 | Cole et al. |
| 5,671,523 A | 9/1997 | Juchinewicz |
| 5,676,504 A | 10/1997 | Mueller et al. |
| 5,677,522 A | 10/1997 | Rice et al. |
| 5,711,643 A * | 1/1998 | Parr et al. ............... 409/83 |
| 5,739,766 A | 4/1998 | Chaloux |
| 5,764,156 A | 6/1998 | Chaloux |
| 5,771,176 A | 6/1998 | Froehlich et al. |
| 5,807,042 A | 9/1998 | Almblad et al. |
| 5,855,836 A | 1/1999 | Leyden et al. |
| 5,886,775 A | 3/1999 | Houser et al. |
| 5,906,365 A | 5/1999 | Wu |
| 5,908,273 A | 6/1999 | Titus et al. |
| 5,926,388 A | 7/1999 | Kimbrough et al. |
| 5,940,229 A | 8/1999 | Baumgarten |
| 5,964,554 A | 10/1999 | Drori |
| 5,966,457 A | 10/1999 | Lemelson |
| 5,982,491 A | 11/1999 | Breyer et al. |
| 5,984,597 A | 11/1999 | Chen |
| 5,997,224 A | 12/1999 | Beauregard et al. |
| 5,997,795 A | 12/1999 | Danforth et al. |
| 6,053,677 A | 4/2000 | Juchinewicz |
| 6,059,495 A | 5/2000 | Mueller et al. |
| 6,064,747 A | 5/2000 | Wills et al. |
| 6,065,911 A | 5/2000 | Almblad et al. |
| 6,082,580 A | 7/2000 | Mueller et al. |
| 6,094,953 A | 8/2000 | Evans |
| 6,152,662 A | 11/2000 | Titus et al. |
| 6,175,638 B1 | 1/2001 | Yanovsky |

(56) References Cited

U.S. PATENT DOCUMENTS

| | | | |
|---|---|---|---|
| 6,179,531 | B1 | 1/2001 | Jaw |
| 6,185,311 | B1 | 2/2001 | Yanovsky et al. |
| 6,186,711 | B1 | 2/2001 | Mueller |
| 6,243,960 | B1 | 6/2001 | Andrews et al. |
| 6,321,430 | B1 | 11/2001 | Goldman et al. |
| D455,104 | S | 4/2002 | Hillman et al. |
| 6,406,227 | B1* | 6/2002 | Titus et al. .................. 409/81 |
| 6,415,931 | B1 | 7/2002 | Mueller |
| 6,449,381 | B1 | 9/2002 | Yanovsky et al. |
| 6,478,515 | B1 | 11/2002 | Mueller |
| 6,543,972 | B1* | 4/2003 | Cimino .......................... 409/83 |
| 6,588,995 | B2* | 7/2003 | Wills et al. .................. 409/131 |
| 6,602,030 | B1 | 8/2003 | Markbreit |
| 6,612,142 | B1 | 9/2003 | Capwell |
| 6,641,339 | B2 | 11/2003 | Chies et al. |
| 6,647,308 | B1* | 11/2003 | Prejean ........................ 700/117 |
| 6,687,565 | B2 | 2/2004 | Wetterlin et al. |
| 6,711,557 | B1 | 3/2004 | Palaniappan |
| 6,801,829 | B2 | 10/2004 | Kawai |
| 6,817,814 | B2 | 11/2004 | Mueller |
| 6,836,553 | B2 | 12/2004 | Campbell et al. |
| 6,839,449 | B1 | 1/2005 | Campbell et al. |
| 6,839,451 | B2 | 1/2005 | Campbell et al. |
| 6,895,100 | B1 | 5/2005 | Pacenzia et al. |
| 6,959,862 | B2 | 11/2005 | Neumark |
| 6,965,911 | B1 | 11/2005 | Coffman et al. |
| 7,010,498 | B1 | 3/2006 | Berstis |
| 7,111,894 | B2 | 9/2006 | Kora et al. |
| 7,114,436 | B1 | 10/2006 | Mueller |
| 7,114,894 | B2 | 10/2006 | Mueller et al. |
| 7,163,364 | B2 | 1/2007 | Foscan et al. |
| 7,214,011 | B2 | 5/2007 | Ryai, Sr. et al. |
| 7,484,446 | B1* | 2/2009 | Gula ....................... B21D 53/42 76/110 |
| 7,643,685 | B2 | 1/2010 | Miller |
| 7,891,919 | B2 | 2/2011 | Bass et al. |
| 7,918,629 | B2 | 4/2011 | Belflower et al. |
| 8,128,322 | B2 | 3/2012 | Bass et al. |
| 8,532,809 | B2 | 9/2013 | Freeman |
| 8,585,029 | B2 | 11/2013 | Ryai, Sr. |
| 8,634,655 | B2* | 1/2014 | Thompson et al. .......... 382/209 |
| 8,644,619 | B2 | 2/2014 | Thompson et al. |
| 2001/0033781 | A1 | 10/2001 | Wills et al. |
| 2001/0056385 | A1 | 12/2001 | Timms et al. |
| 2002/0031251 | A1 | 3/2002 | Campbell et al. |
| 2002/0168241 | A1 | 11/2002 | David et al. |
| 2002/0191849 | A1* | 12/2002 | Campbell et al. ............ 382/181 |
| 2003/0145499 | A1 | 8/2003 | Tarter et al. |
| 2003/0154135 | A1 | 8/2003 | Covington et al. |
| 2003/0205070 | A1 | 11/2003 | Chaum |
| 2004/0024486 | A1* | 2/2004 | Almblad et al. .............. 700/185 |
| 2004/0036595 | A1 | 2/2004 | Kenny et al. |
| 2004/0095380 | A1 | 5/2004 | Bass et al. |
| 2004/0253067 | A1 | 12/2004 | Bosch |
| 2005/0000052 | A1 | 1/2005 | Byles |
| 2005/0216120 | A1 | 9/2005 | Rosenberg et al. |
| 2006/0003676 | A1 | 1/2006 | Bernard et al. |
| 2006/0147289 | A1* | 7/2006 | Gimelfarb et al. ........... 409/277 |
| 2007/0224008 | A1* | 9/2007 | Bass et al. .................... 409/132 |
| 2007/0234614 | A1 | 10/2007 | Tarter et al. |
| 2008/0145163 | A1* | 6/2008 | Freeman et al. ............... 409/83 |
| 2008/0252551 | A1 | 10/2008 | Kubo et al. |
| 2009/0074528 | A1 | 3/2009 | Hadad |
| 2009/0180664 | A1 | 7/2009 | Efstathiades et al. |
| 2011/0262240 | A1 | 10/2011 | Mutch et al. |
| 2012/0243957 | A1* | 9/2012 | Drake et al. ................... 409/81 |

FOREIGN PATENT DOCUMENTS

| | | |
|---|---|---|
| EP | 0053730 | 10/1981 |
| EP | 0133091 | 2/1985 |
| EP | 0835720 | 4/1998 |
| EP | 1976656 | 10/2014 |
| ES | 2017240 | 1/1991 |
| FR | 2499435 | 8/1982 |
| GB | 2276106 | 9/1994 |
| JP | S59201708 | 11/1984 |
| JP | 63-31108 | 12/1988 |
| JP | 63-31109 | 12/1988 |
| JP | 4-250911 | 9/1992 |
| MX | 291113 | 1/2007 |
| WO | WO90/03867 | 4/1990 |
| WO | WO91/13535 | 9/1991 |
| WO | WO96/19309 | 6/1996 |
| WO | WO01/57472 | 8/2001 |
| WO | WO0201480 | 1/2002 |
| WO | WO2005042196 | 5/2005 |
| WO | WO2007087389 | 8/2007 |
| WO | WO2012096685 | 7/2012 |

OTHER PUBLICATIONS

Chinese Office Action, Application No. 201080024166.7, Hy-Ko Products Company, Dec. 6, 2013.
Chinese Office Action, Application No. 201080024166.7, Hy-Ko Products Company, Sep. 30, 2014.
Chinese Office Action, Application No. 201080024163.3, Hy-Ko Products Company, Aug. 1, 2013.
Supplementary European Search Report, Application No. 07709849.9-1702/ 1976656, Hy-Ko Products Company, May 15, 2013.
Extended European Search Report, Application No. 07709849.9-1702/ 1976656, Hy-Ko Products Company, Apr. 26, 2013.
European Communication pursuant to Article 94(3) EPC, Application No. 10 770 489.2-1901, Hy-Ko Products, Jun. 27, 2014.
Supplementary European Search Report, Application No. 10770489.2-1901/ 2424690, Hy-Ko Products, Nov. 12, 2013.
Extended European Search Report, 10770489.2-1901 / 2424690, Hy-Ko Products, Oct. 25, 2013.
European Communication pursuant to Article 94(3) EPC, Application No. 12 003 030.9-1702, Hy-Ko Products Company, Mar. 20, 2014.
European Communication pursuant to Article 94(3) EPC, Application No. 12 003 030.9-1702, Hy-Ko Products Company, Jul. 30, 2013.
Extended European Search Report, Application No. 12003030.9-2302, Hy-Ko Products Company, Sep. 4, 2012.
European Communication pursuant to Article 94(3) EPC, Application No. 03 767 220.1-2201, Hy-Ko Products, Aug. 18, 2010.
European Supplementary Search Report, Application No. 03767220.1-2201, Hy-Ko Products, Jul. 18, 2007.
Mexican Office Action, Application No. MX/A/2011/011630, Hy-Ko Products, Nov. 18, 2014.
Mexican Office Action, Application No. MX/A/2011/011630, Hy-Ko Products, Apr. 28, 2014.
International Preliminary Report on Patentability, PCT/US2011/034564, Mutch, William R. et al., Jul. 16, 2013.
International Search Report and the Written Opinion of the International Searching Authority, PCT/US2011/034564, Hy-Ko Products Company, Jul. 15, 2011.
International Preliminary Report on Patentability, PCT/US2010/033414, Hy-Ko Products et al., Nov. 1, 2011.
International Search Report and the Written Opinion of the International Searching Authority, PCT/US2010/033414, Hy-Ko Products, Aug. 18, 2010.
International Preliminary Report on Patentability, PCT/US2007/002015, Hy-Ko Products Company, Jul. 29, 2008.
International Search Report and the Written Opinion of the International Searching Authority, PCT/US2007/02015, Hy-Ko Products Company, Sep. 28, 2007.
International Preliminary Report on Patentability, PCT/US2010/033421, Hy-Ko Products et al., Nov. 1, 2011.
International Search Report and the Written Opinion of the International Searching Authority, PCT/US2010/033421, Hy-Ko Products, Sep. 17, 2010.
Giuliani Productivity Through Flexibility, Multicode CCE-1, 2 pages.

(56) References Cited

OTHER PUBLICATIONS

Giuliani Productivity Through Flexibility, Multicode CCE-2, 3 pages.
Farzin Mokhtarian and Hiroshi Murase, Silhouette-Based Object Recognition through Curvature Scale Space, IEEE, Proceedings from Fourth International Conference on Computer Vision, 1993, pp. 269-274.
Ihtisham Kabir, A Computer Vision System Using Fast, One Pass Algorithms, (Thesis), Graduate Division of the University of California, Davis, 1986 pp. 1-164.
Roger D. Quinn et al., Design of an Agile Manufacturing Workcell for Light Mechanical Applications, Apr. 1996, pp. 858-863, Proceedings from the 1996 IEEE International Conference on Robotics and Automation, Minneapolis, Minnesota.
Anil K. Jain, Fundamentals of Digital Image Processing, Ch. 9, Image Analysis and Computer Vision, University of California, Davis, 1989, pp. 342-430, Prentice Hall, Inc., Englewood Cliffs, NJ.
Amir Novini, Fundamentals of Machine Vision Lighjting, IEEE, Proceedings of Northcon 93 Electrical Electronics Convention, 1993, pp. 38-46.
Wesley E. Snyder, Industrial Robots Computer Interfacing and Control, Ch., 13 Computer Vision, North Carolina State University, 1985, pp. 248-283, Prentice-Hall, Inc., Englewood, NJ.

\* cited by examiner

KEY BLANK IDENTIFICATION SYSTEM WITH BITTING ANALYSIS

CROSS-REFERENCE TO RELATED APPLICATIONS

This application is a continuation of U.S. patent application Ser. No. 12/772,763 entitled "KEY BLANK IDENTIFICATION SYSTEM WITH BITTING ANALYSIS," which claims the benefit of priority of U.S. Provisional Patent Application Ser. No. 61/215,122 filed on May 1, 2009, and U.S. Provisional Patent Application Ser. No. 61/275,648 filed on Sep. 1, 2009, each of which are hereby incorporated by reference in their entirety.

FIELD OF ART

This invention relates generally to the field of systems for identifying objects and, more particularly to systems for utilizing a means for identifying key blanks that are functionally compatible with an unknown key.

BACKGROUND OF THE INVENTION

The art of key replication is well known. Commonly, a key intended for duplication (the master key) is copied on to an appropriately identified key blank utilizing any number of different systems known in the art. The process of identifying an appropriate key blank to use when making copies of a key can be a difficult, tedious and time consuming affair. It is important that each master key be copied onto the proper key blank so as to prevent numerous adverse consequences caused by reproducing a master key onto an inappropriate key blank. However, choosing the correct key blank can be difficult even for experts in the field.

There are hundreds, if not thousands, of key blanks, and many blanks are not readily distinguished from others. Identifying the correct key blank for use in duplication involves selecting a blank from hundreds or even thousands of possibilities, where differences between key blanks may be very subtle. These hard-to-notice subtleties significantly increase the level of difficulty for all operators of such key replication systems, both inexperienced trainees and experts alike.

Once a key blank is chosen, it goes through a cutting process. The typical cutting process simply traces the profile of the master key onto the key blank, such that the key blank will exactly match (within the error limits and accuracy of the tracing machine) the original master key. Normally, a mechanically linked cutting wheel actually cuts into the key blank while it mimics the movement of the tracer as the tracer moves longitudinally along the profile of the master key. If the incorrect key blank is provided during this process, the key blank being formed into the duplicate key may not possess the correct longitudinal length, thereby causing a failure. When this type of failure occurs, the entire process of selecting a key blank for replication and then mechanically cutting the key must begin again. Worse still, if the blank has the proper length but does not possess the appropriate thickness, contour, groove or other traits, the failure may not be discovered until the key is actually inserted into the lock.

Businesses that offer key cutting services are often times not staffed by experienced locksmiths. Instead, employees are usually trained to "eyeball" what is thought to be the correct blank and then cut a duplicate key. Such informal and imprecise key blank identification invariably increases the rate of failures for the duplication process. These failures often occur at the expense of the industry and to the extreme dismay of the key holder. Therefore, the industry would welcome an easy-to-use key blank identification system that increases the accuracy and efficiency of key replication.

Not surprisingly, numerous attempts have been made to improve identification systems and/or key replication systems. Many of these improvements include imaging systems designed to determine the proper key blank based on physical parameters of the key to be copied, such as length, shape, and groove characteristics.

While many of these systems provide useful improvements for determining a proper key blank, they still suffer from various deficiencies. Specifically, many of these systems compare scanned data from a master key with data of known key blanks. However, in some instances the scanned key parameters and the key blank data are insufficient to determine the proper key blank. In such cases, additional information about the master key and the key blank would be useful in narrowing the field of prospective key blanks. Accordingly, an improved system and method for determining a key blank is needed.

SUMMARY

A key identification system is provided. The key identification system comprises a sensing device configured to determine information and characteristics of a master key, and a logic to analyze the information and characteristics of the master key. The sensing device may be configured to capture information about the bittings of the master key. The logic analyzes information about the bittings and compares it with bitting characteristics of known key blanks to determine the likelihood of a match between the master key and the known key blanks.

In an embodiment, the system configured to extract bitting information may comprise an imaging system, such as a camera or other imaging device. The camera may capture an image, such as a digital image, of the bittings of the master key to be analyzed by the logic.

DESCRIPTION OF THE DRAWINGS

Objects and advantages together with the operation of the invention may be better understood by reference to the following detailed description taken in connection with the following illustrations, wherein.

DETAILED DESCRIPTION OF THE INVENTION

Reference will now be made in detail to exemplary embodiments of the present invention, examples of which are illustrated in the accompanying drawings. It is to be understood that other embodiments may be utilized and structural and functional changes may be made without departing from the respective scope of the present invention.

A system for identifying a key blank ("key ID system") and method for identifying a key blank are provided. The key ID system analyzes a master key to be duplicated, such as a house key, car key or other key, and determines the appropriate key blank to be used. The system and method described herein may be used independently to determine a proper key blank, or may be used in conjunction with other systems to narrow the field of prospective key blanks. Moreover, it will be understood that existing key identification systems may be modified or retrofitted to implement some or all features described herein.

Figure 1:
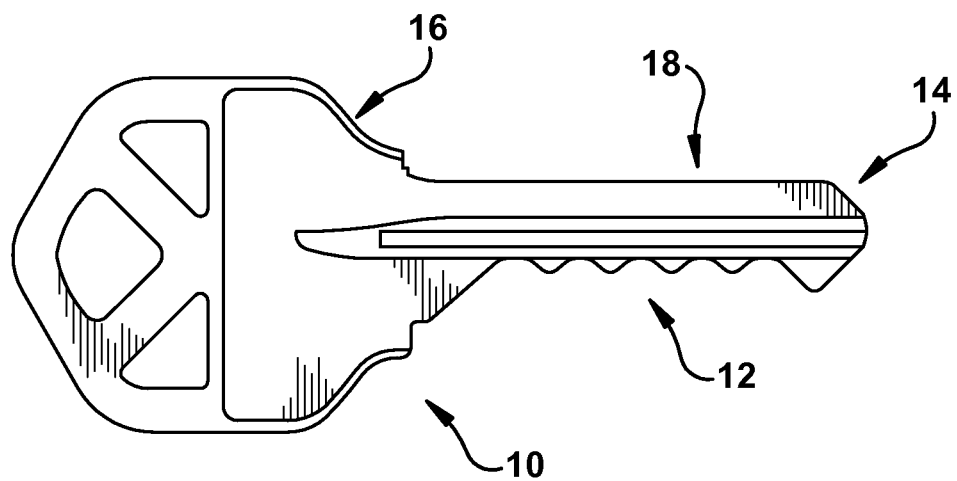
FIG. 1. illustrates a master key.

With reference to FIG. 1, a master key 10 is depicted. The master key 10 may include standard key features such as a head 16 and a blade 18. The blade 18 may connect at one end to the head 16 with the tip 14 at the opposing end. The master key 10 may include teeth or bittings 12 cut into the blade. The bittings 12 consist of notches cut in the blade 18 to interface with the tumblers of a corresponding lock. The bittings 12 must match up with the lock's unique tumbler configuration in order to activate and turn the lock.

The key ID system may analyze the master key 10 to determine certain physical characteristics of the key 10. Based on these characteristics, the key ID system may then determine the proper key blank to be used to duplicate the master key 10. For example, the key ID system may include a sensing device or system to extract bittings information from a master key 10. The sensing system may sense and capture parameters of the bittings 12. The sensing system may include any mechanical, electronic or optical sensors, sensors, imaging devices or other tools known in the art for extracting physical characteristics of a key or similar object.

In an embodiment, the sensing system for extracting bittings information from the master key 10 includes an imaging system to scan and analyze the physical characteristics of the master key 10. As is known in the art, the imaging system may be a laser imaging system, an optical imaging system, a photo imaging system, or any other imaging system known in the art. The imaging system may scan the master key or capture an image of the master key to determine characteristics of the key that are unique to a specific key blank. Further, it will be appreciated that other known methods or devices, such as electrical, mechanical, or optical sensors, may be used in place of or in conjunction with the imaging system to determine the traits and characteristics of the master key geometry.

Figure 2:
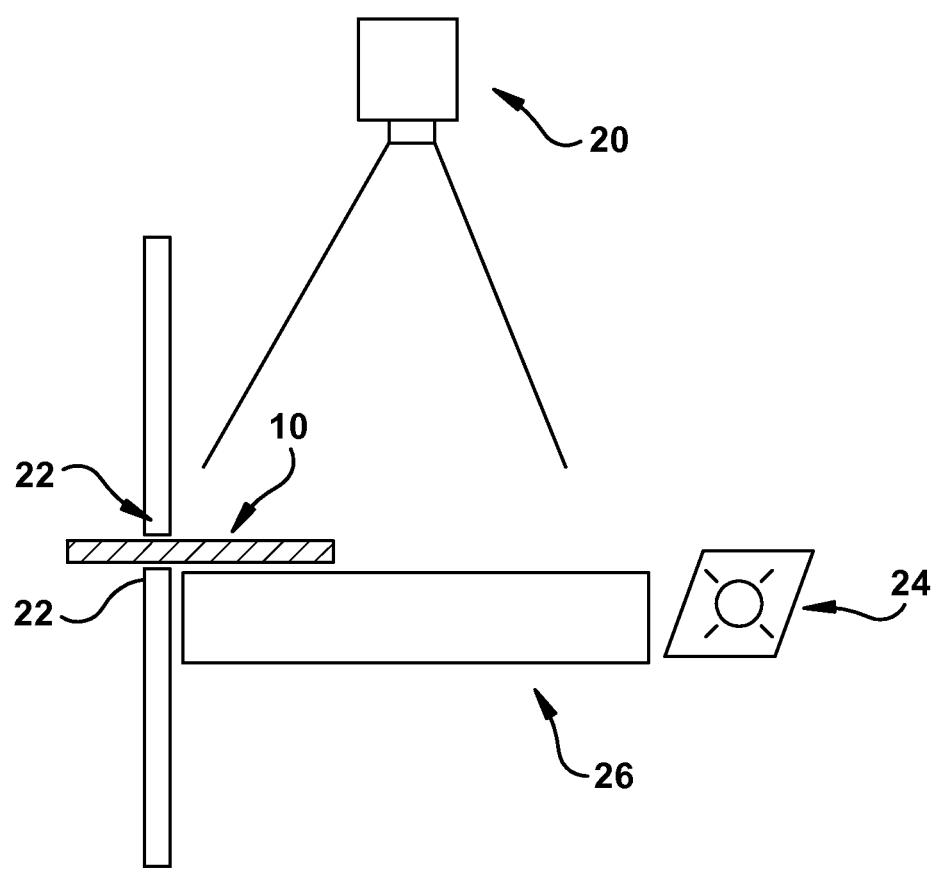
FIG. 2. illustrates an embodiment of the key ID system.

In an embodiment illustrated in FIG. 2, the imaging system includes one or more cameras 20 configured to capture an image, such as digital images, of the master key 10. The camera 20 may specifically be positioned to capture an image of the blade 18 and bittings 12. The camera 20 may be positioned perpendicular to the blade 18. Alternatively, the camera 20 may positioned at an angle or at other position to capture the desired image.

The imaging system may further include other components to aid in capturing images of the master key 10, such as one or more lights 24 and mirrors. The lights 24 may be positioned to enhance the clarity and quality of the image recorded by the imaging system. For example, the light 24 may be positioned to provide backlighting for the key. The mirrors may be positioned to allow a camera in a first position to record an image of the key from a second position. The mirrors may further allow a single camera to record multiple images of the master key from different angles, thereby increasing the amount of information related to the master key recorded by a single camera.

As illustrated in FIG. 2, the image system may include one or more reflectors 26. The reflector 26 may be positioned to direct light to a desired location. For example, as shown in FIG. 2, a reflector may be positioned underneath the key 10 and facing the light 24. The reflector 26 may be angled, such as tilted upwards, to direct light from the light 24 to the underside of the key 10, thereby providing backlighting of the key 10. It will be appreciated, however, that the light 24 and reflector 26 may be arranged in any configuration to optimize or clarify the image of the key 10.

The key ID system may include a key holder 22 to hold the master key 10. The key holder may be any device capable of holding or supporting a master key 10. For example, as shown in FIG. 2, the key holder 22 may comprise a lower support and an upper door to close onto the key 10. The key holder may alternatively comprise a clamp, gripper, platform, suspension, or any other device configured to hold the master key 10.

As described in further detail below, the key ID system may analyze characteristics of the master key's teeth or bittings 12. Because the bittings 12 are configured to match up with the corresponding lock's unique tumbler configuration, various characteristics of the bittings 12 are often unique to certain types of key blanks. For example, certain key manufacturers may use distinct bitting patterns, or a set of unique bitting patterns, for their locks or for a group of locks. Additionally, certain types of keys, such as house keys or car keys, may use a different bittings configuration than other types of keys. By analyzing the master key bittings 12 and comparing them to bitting configurations used with known key blanks, the field of prospective matching key blanks may be greatly reduced.

The key ID system may include a logic to analyze bitting characteristic information captured by the key ID system. As used herein, the term "logic" includes but is not limited to a software, a firmware, an executable program, a hardware or hard-wired circuit, or combinations thereof. For example, based on a desired application or needs, a logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

The logic may be configured to determine a correlation or likelihood of a match between a known key blank and the master key 10. For example, the logic may include a database to store key related information ("key data"). The key data may include characteristics of known key blanks, such as length, shape, bitting information, size, shape and location of key grooves, and other geometric and physical characteristics of known key blanks. The database may be integral with the logic, in communication with the logic, or remotely accessible to the logic. The database may associate key data with specific key blanks or with types or groups of key blanks. For example, the database may associate key data with specific key manufacturers or different types of keys such as house keys or car keys. The key ID system may access the database to compare scanned characteristics of the master key with the stored key data in the database. Key blanks that do not have characteristics consistent with those of the master key may be then ruled out as possible matches for the key blank. The key ID system may scan the master key 10 at one or more angles and compare the scanned data with stored key data.

In an embodiment, the database stores key data related to bittings used with known key blanks. Traditionally, key bittings are represented as a numeric bitting code that contains information as to how a key is to be cut by a locksmith. Often the bitting code is a series of integers (e.g. 372164) that may be translated or decoded from a key code chart or bitting code list. However, not all the information in the bitting code is necessary in order to determine unique properties of the bittings. Therefore, the database may store data related to known key bitting patterns other than numeric bitting codes. For example, the database may store measurements of bitting geometries used with known key blanks.

Stored bitting geometries may include bitting spacings, notch depths, blade width, and bitting flat width. Spacing data may relate to the location or spacing between of each bitting notch along the length of the key blade 18. Spacing data may be measured from the center of each notch to a specific reference point, such as the tip 14 or shoulder of the blade 18. Depth data may relate to the depth of each bitting notch and may be measured as the distance between a reference edge, such as the back side or center line of the blade 18, and the notch surface. Blade width may relate to the width of the blade surface to be cut. Bitting flat width may relate to the width of each notch surface and may be measured as the distance across the bottom of the notch.

In an embodiment, the logic may determine bitting parameters of the master key 10 by analyzing an image captured by an imaging system. The bitting parameters may be compared to bitting data in the database to determine if the master key 10 matches a key blank or blanks in the database. As shown in FIGS. 3-6, bitting parameters of the master key, such as spacing and depth, may be analyzed at various preselected points, such as at the bitting notches. The master key bitting parameters may then be compared to bitting data in the database. If the bitting parameters of the master key match the bitting data of a key blank in the database, then that key blank may be appropriate for duplicating the master key. For example, if each bitting depth of a master key 10 is very close to an allowable bitting depth for a given key blank, then the key blank may be a match. Likewise, if the bitting flat width and spacing of the bittings of a master key 10 are close to allowable bitting flat widths and spacings for a given key blank, then the key blank may be a match. However, if the bitting data of the master key is not close to allowable data for a given key blank, then the given key blank or blanks may be ruled out as a possible match.

The database may associate bitting data with various key-related identifiers. For example, while bitting data may be directly associated with specific key blanks, it may also be associated with groups of keys, such as keys made by a specific key manufacturer or certain types of keys. Accordingly, large groups of potential key blanks may be ruled out if a bitting parameter of the master key does not match a bitting parameter shared by the group of keys.

The bitting positions can be analyzed in any number of methods. One embodiment includes first determining the pattern of the unknown subject key. Each stored pattern may then be tested against the subject key. The test may involve checking each of the known spacing positions for the stored pattern and seeing if there is a bitting at that position. To accomplish this, the logic may analyze or measure the slope or angle with respect to the length of the blade 18 of the master key pattern near the sample position and determining if there is a "flat" in that position. A flat could be defined as a small segment of the pattern (0.020" wide for example) with a slope or angle that is close to 0 degrees, (less than 17 degrees for example) that is either centered, just left or right of, the target spacing position. If a flat is identified, then the depth of the flat can also be identified from the subject key pattern relative to the reference axis.

Figure 3:
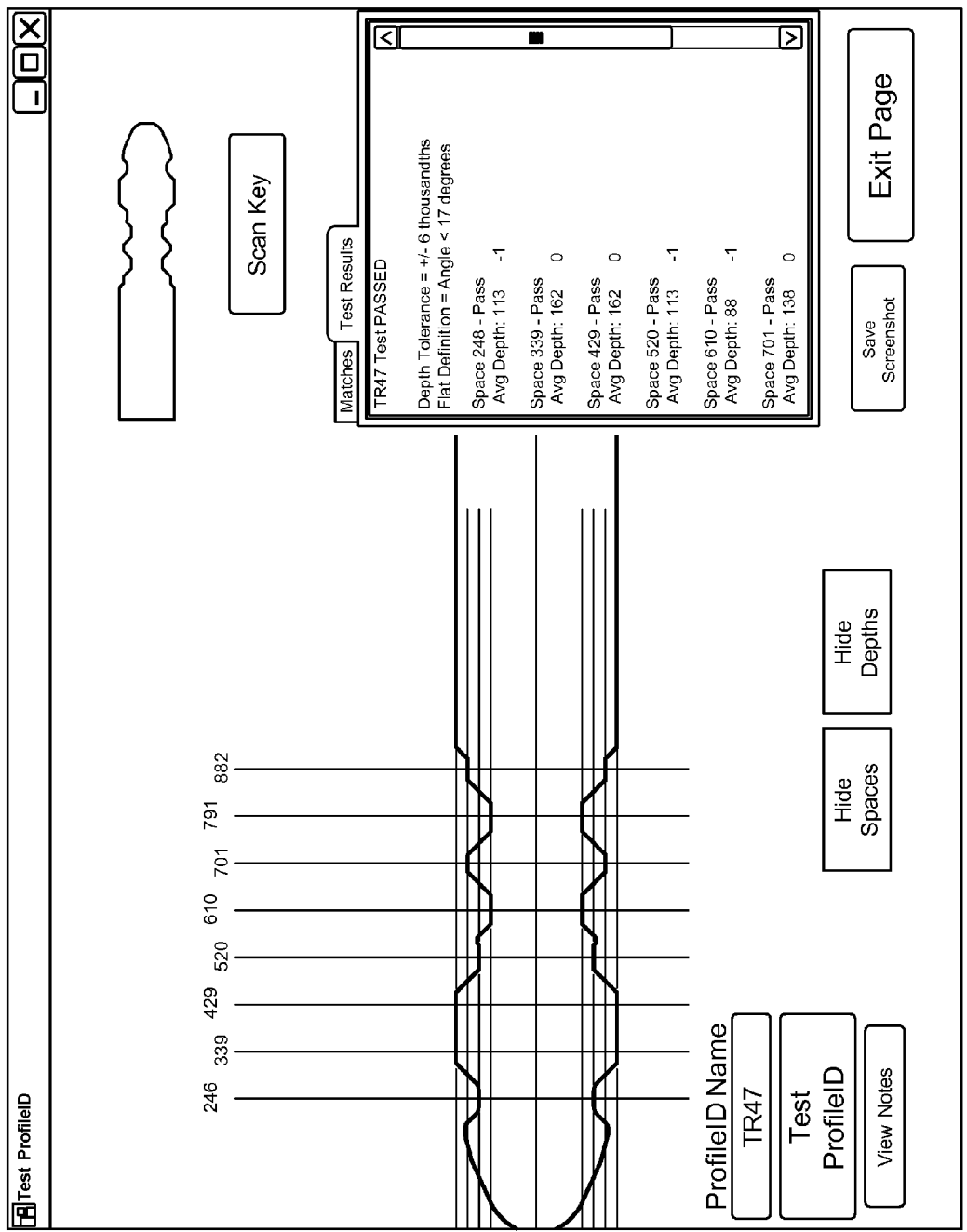
FIG. 3 illustrates an example comparison chart between a TR47 master key and TR47 key data.
Figure 4:
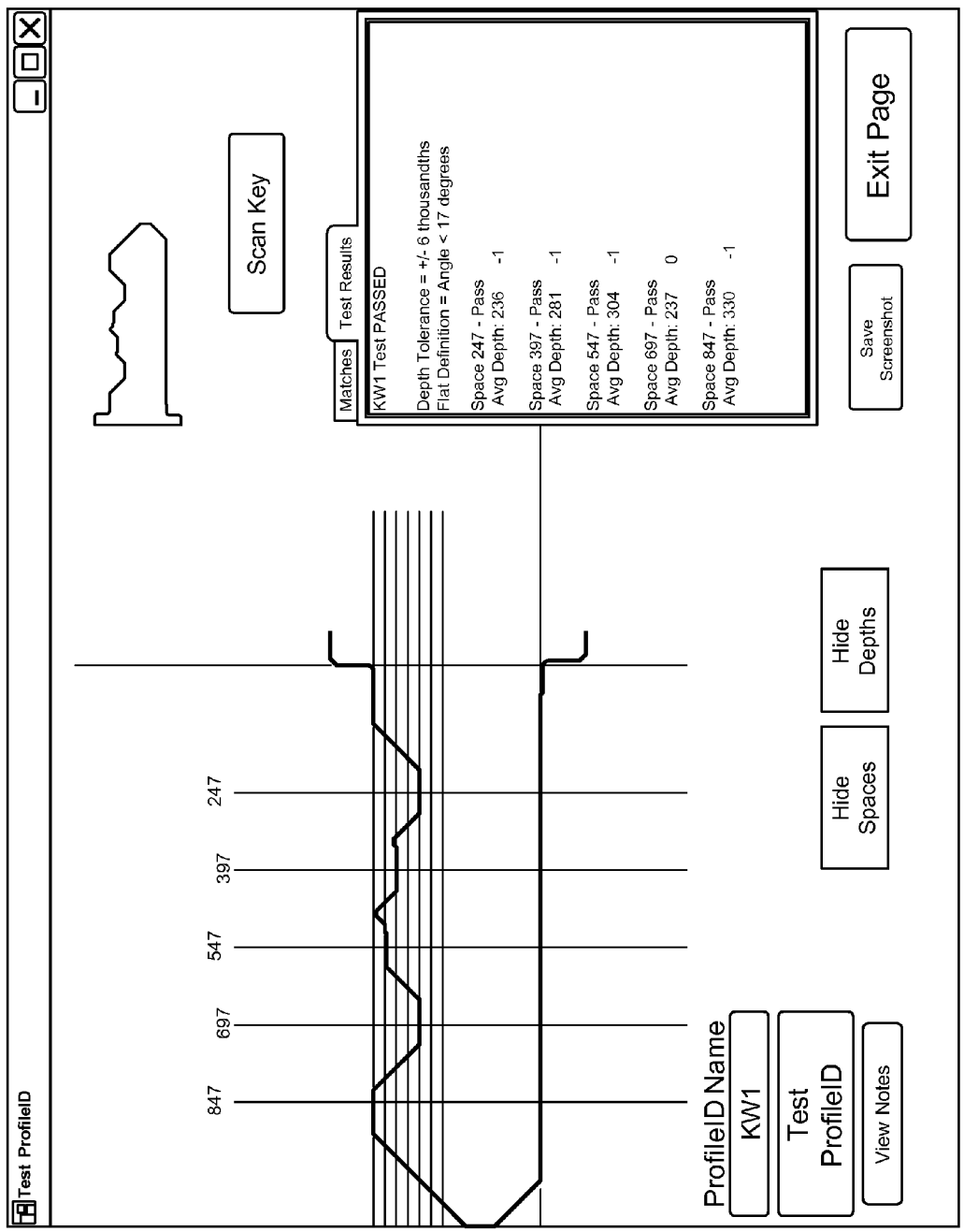
FIG. 4 illustrates an example comparison chart between a KW1 master key and KW1 key data.
Figure 5:
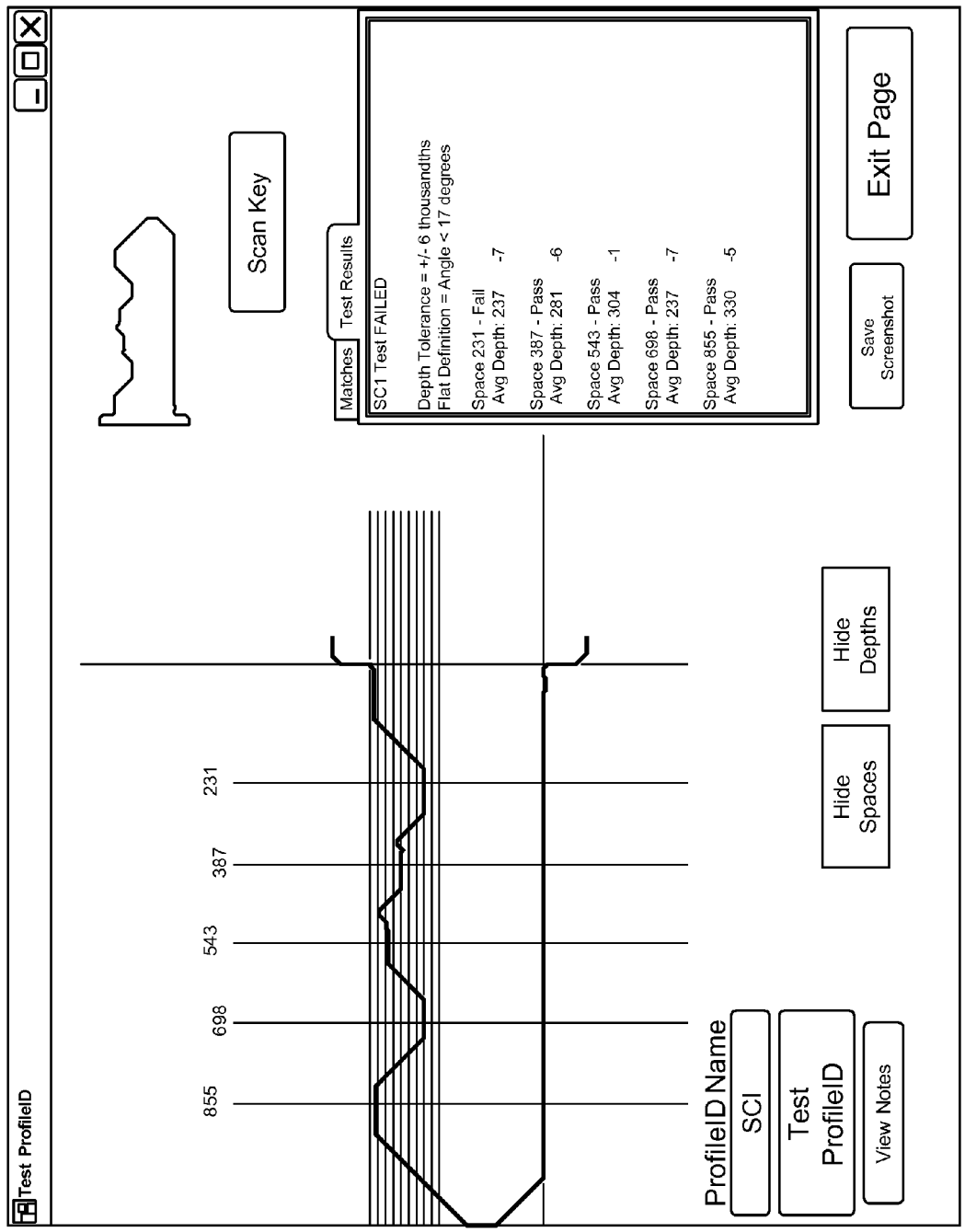
FIG. 5 illustrates an example comparison chart between a KW1 master key and SC1 key data.
Figure 6:
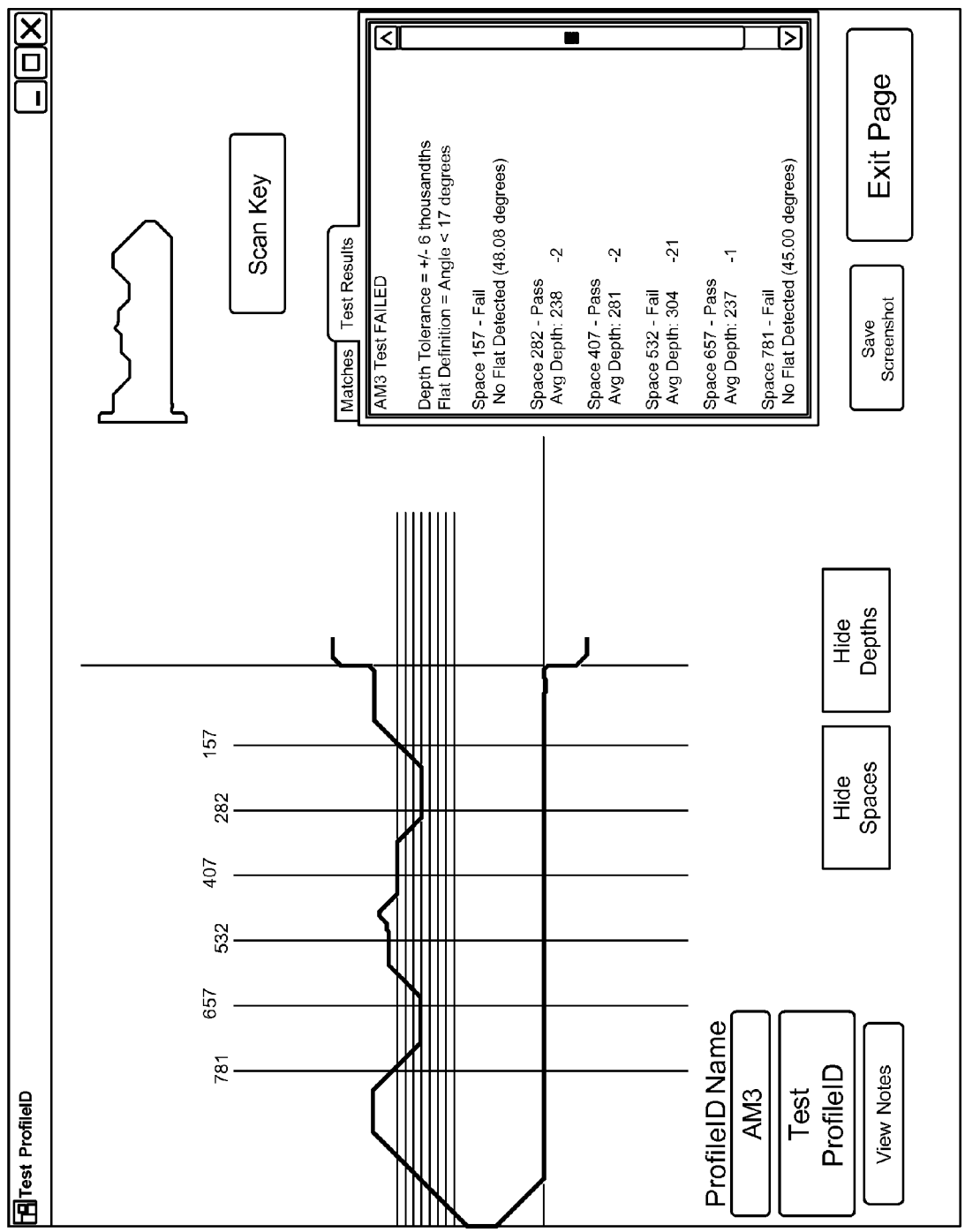
FIG. 6 illustrates an example comparison chart between a KW1 master key and AM3 key data.

To account for reasonable variances in the master key, the key ID system may set tolerance ranges for each bitting parameter measurement. In order for a key blank to match a master key, the comparison values must fall within the predetermined tolerance range. For example, as illustrated in the test results window of FIGS. 3-6, the tolerance range for bitting depth may be set to plus or minus six thousandths of an inch. In order for the master key to match a key blank, each depth measurement comparison must fall within this range. As shown in FIGS. 3 and 4, the comparison values are all between −1 and +1, indicating a match between the master key and the tested key blank or blanks FIGS. 5 and 6, however, illustrate comparison values of greater than 6, indicating that the master key does not match the tested key blank or blanks. The pass/fail limits (tolerance range) could be based on a set range, a set percentage of the depth offsets of the target key, or some other parameter. The limits may be set the same for all keys or may be individualized on a key-by-key basis.

To account for positional variation inherent to the subject keys and/or the inspection system, the pattern matching algorithms may be repeated while shifting the data by small increments (0.020" for example) in either or both directions. For example, if a key blank was slightly miscut and the spacing was shifted from the nominal position, the search may fail at the nominal position but may identify the pattern shifted slightly over from the nominal position.

The spacing and depth evaluations may be measured using a scoring system of 0 to 100%, where 0 is considered to be an impossible match and 100 is a perfect match. The total bitting score is then the product of the combined spacing and depth scores.

The logic may compare the bittings of a master key 10 to key data related to a key blank in the database and evaluate a series of preset spacing point for the given key blank. For example, the geometry of the master key 10 may be analyzed at each spacing point. A score may be given to each spacing point based on the flatness of the bitting 12 at the spacing point and a measurement of the variation or slope of the bitting 12 relative to the database depths. The relationships between angles can be varied to achieve optimal results. The flatter the area near the spacing point, the higher the score. For example, zero degrees (or flat) might represent a score of 100 and 45 degrees might represent 0. Similarly, the logic may analyze the depth of the blade at each spacing point give a score to the spacing point based on the variation from one of the valid depths for the given key blank stored in the database. For example, no variation might represent a score of 100 and 2× the differences between depths might represent a score of 0.

The logic may compute this evaluation for each of the spacing points and then compute a total by averaging all the points. This entire process may be repeated with a slight shift towards the head 16 of the key 10 and again with a shift towards the tip 14 of the key 10. This will compensate for a key 10 that has a slight spacing shift. The best of the three totals are used in the final results for the bitting evaluation.

The logic may determine the centers of each of the flats on the bittings 12 of the master key 10. Because the center of a flat that is on the peak of a bitting may be skewed due to the depth of the bitting on the left and right, the logic may ignore peaks. The logic may also ignore ridges because the center of flats that are on ridges may be skewed due to the depth and height of the bittings 12 on either side. However, flats that are located in "valleys," or between bittings of lesser depth, are often properly centered regardless of what is on either side. For each identified valley, the logic may compare the nearest database spacing position and a score is given. A total spacing score is then computed based on the average score for each of the valleys.

It will be appreciated that the database is not limited to bittings data. In addition to bittings data, the database may store information related to other identifying parameters of the key. The key ID system may utilize other key parameters, in combination with bittings information, to narrow the field of possible key blanks.

The key ID system as described may be used in conjunction with other known key identification systems. For example, the key ID system may be used in conjunction with user interface identification systems, such as the object identification system disclosed in U.S. Publication No. 2004/0095380 and the key duplication system disclosed in U.S. Publication No. 2007/0224008, each of which are hereby incorporated by reference in their entirety.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, we claim:

1. A key identification system comprising:
   a sensing system configured to extract bitting information from a master key; and
   a logic configured to analyze said bitting information to determine at least one geometric characteristic of the shape of said bittings of said master key and further to compare said geometric characteristic of said bittings with bitting characteristics of known key blanks to determine the likelihood of a match between said master key and a known key blank
   wherein said at least one geometric characteristic of the shape includes at least one of a depth of a bitting, a width of a bitting, a bitting profile shape, and a spacing between the bittings, and at least one of a—location, slope, angle, or radius of a feature of said master key;
   wherein said data related to bitting characteristics of known key blanks includes a set of bitting centers associated with a given key blank.

2. The key identification system of claim 1, wherein said sensing system includes an imaging system.

3. The key identification system of claim 2, wherein said imaging system is configured to capture an image of the bittings of said master key.

4. The key identification system of claim 2, wherein said imaging system includes a camera.

5. The key identification system of claim 4, wherein said camera is positioned perpendicular to the blade of said master key.

6. The key identification system of claim 2, wherein said imaging system includes a light.

7. The key identification system of claim 3, wherein said captured image is a digital image.

8. The key identification system of claim 1 further comprising a key holder to hold said master key.

9. The key identification system of claim 8, wherein said key holder comprises a support and an upper door.

10. The key identification system of claim 1, wherein said data related to bitting characteristics of known key blanks includes a set of depths at given blade spacing points associated with a given key blank.

11. The key identification system of claim 1, wherein said data related to bitting characteristics of known key blanks includes a set of bitting flat widths at given blade spacing points associated with a given key blank.

12. The key identification system of claim 10 wherein said logic compares the depth of the master key bitting at each spacing point to said set of depths for said given key blank.

13. The key identification system of claim 12 wherein said logic computes a score for said given key blank based on the comparison between the depths of said master key at each spacing point and said set of depths for said given key blank.

14. The key identification system of claim 11 wherein said logic compares the bitting flat widths of the master key bitting at each spacing point to said set of bitting flat widths for said given key blank.

15. The key identification system of claim 14 wherein said logic computes a score for said given key blank based on the comparison between the bitting flat widths of said master key at each spacing point and said set of bitting flat widths for said given key blank.

16. The key identification system of claim 1, wherein said logic compares the bitting centers of the master key bitting to said set of bitting centers for said given key blank.

17. The key identification system of claim 16 wherein said logic computes a score for said given key blank based on the comparison between the bitting centers of said master key and said set of bitting centers for said given key blank.

18. The key identification system of claim 1, wherein said logic analyzes one of a bitting depth, a bitting flat width, and a bitting center of said master key at a blade spacing point shifted from said blade spacing point associated with a given key blank.

19. The key identification system of claim 4, further comprising a mirror positioned to allow said camera to capture more than one view of said master key.

20. The key identification system of claim 1, wherein said logic is configured to overlay bitting patterns for a plurality of known keys over said master key bittings.

21. The key identification system of claim 1, wherein said logic includes a tolerance range for each bitting characteristic to determine whether a master key passes or fails to match a known key blank.

22. The key blank identification system of claim 1, wherein said logic is configured to shift the position of said bittings information of said master key to compare with said bitting characteristics of said known key blanks.

23. The key blank identification system of claim 22, wherein said shift includes at least one of a move laterally towards the tip, a move longitudinally towards the head, or a rotation.

* * * * *